Dec. 14, 1943.   S. E. GILLESPIE   2,336,680

SIGNAL APPARATUS

Filed Aug. 19, 1940   4 Sheets-Sheet 1

Dec. 14, 1943.  S. E. GILLESPIE  2,336,680
SIGNAL APPARATUS
Filed Aug. 19, 1940   4 Sheets-Sheet 2
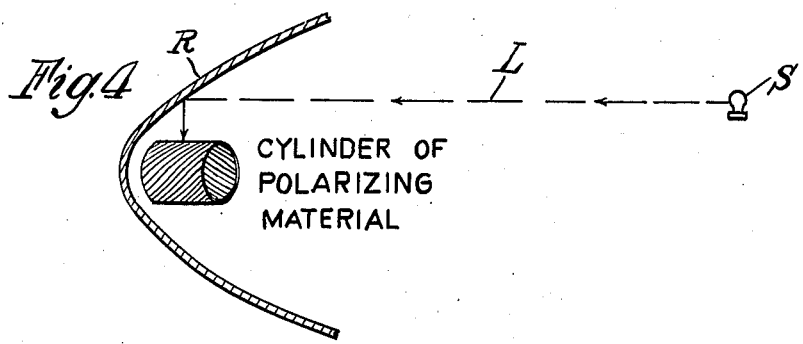
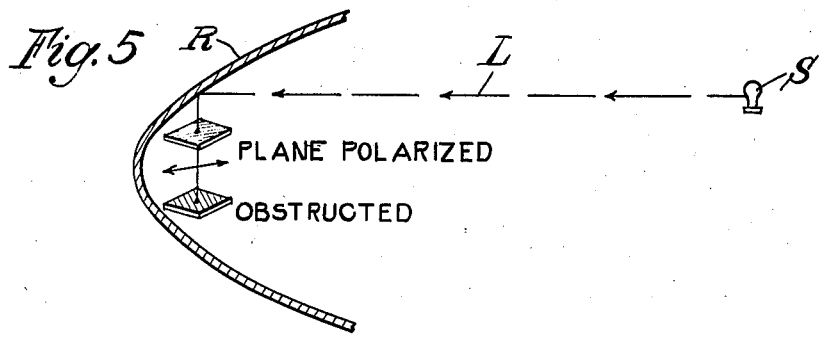
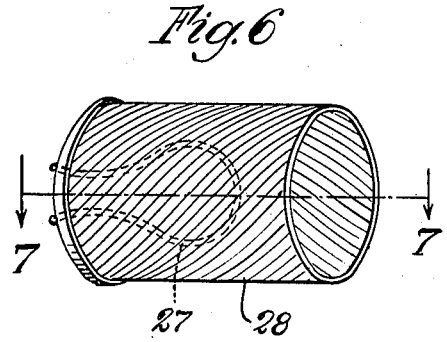
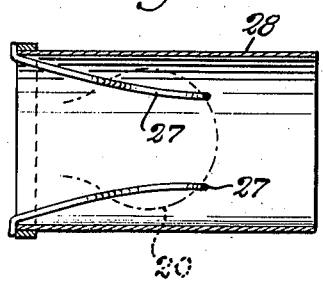
Inventor
Stanley E. Gillespie
by W. D. Seem
Attorney.

Dec. 14, 1943.  S. E. GILLESPIE  2,336,680
SIGNAL APPARATUS
Filed Aug. 19, 1940  4 Sheets-Sheet 3
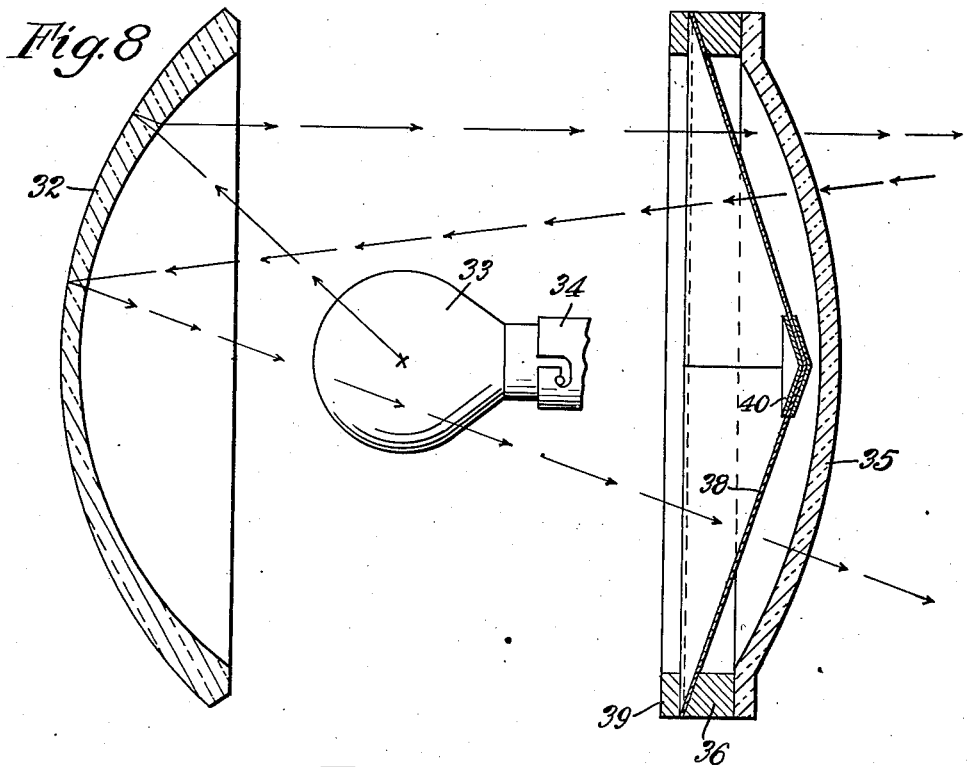
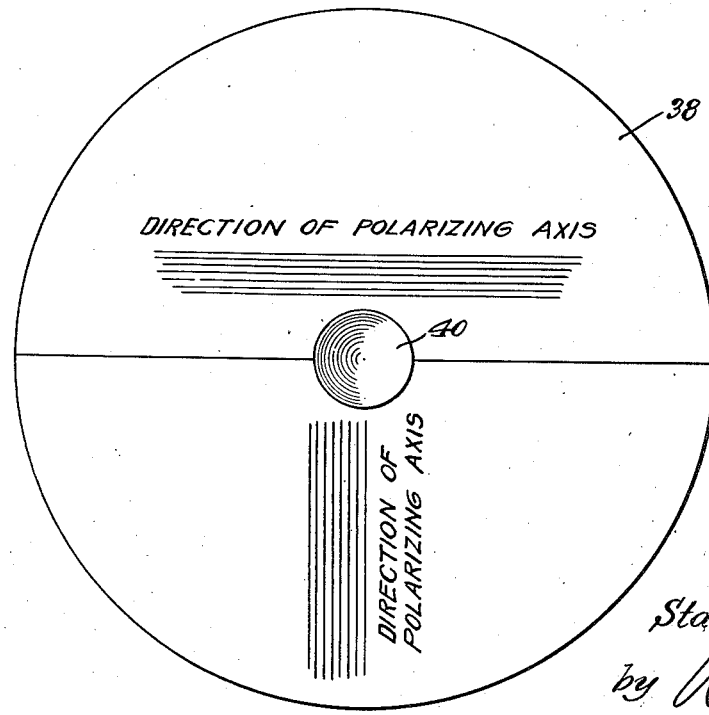
Inventor
Stanley E. Gillespie
by
Attorney.

Dec. 14, 1943.    S. E. GILLESPIE    2,336,680
SIGNAL APPARATUS
Filed Aug. 19, 1940    4 Sheets-Sheet 4
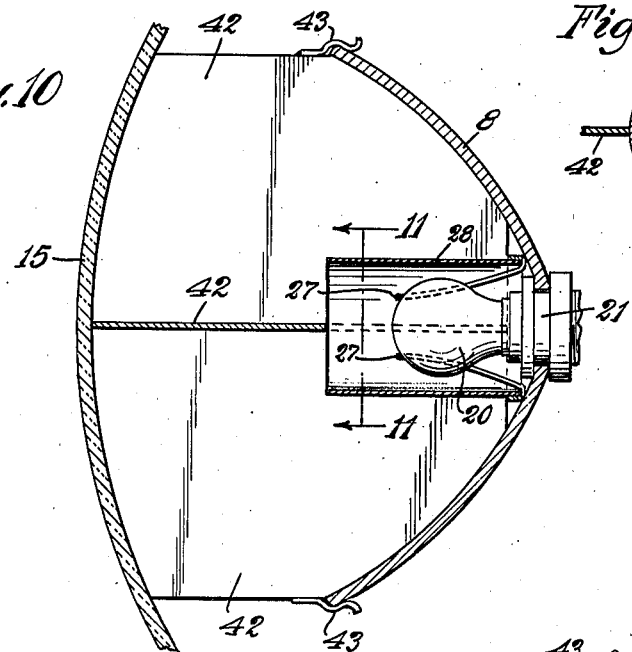
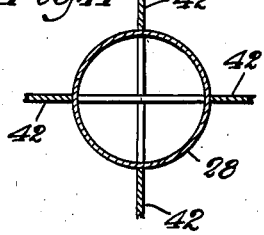
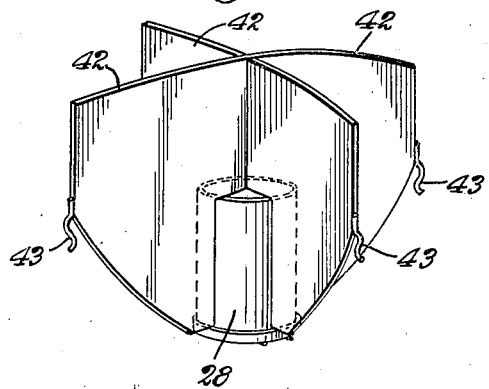
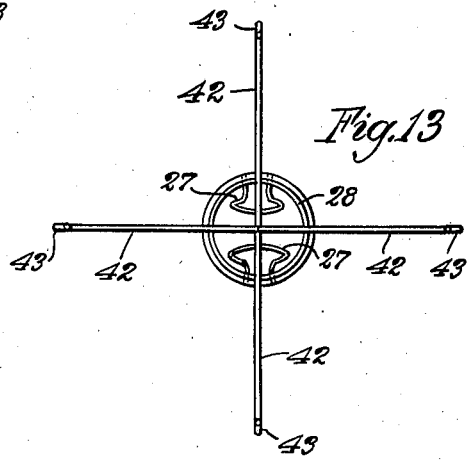
Inventor
Stanley E. Gillespie
by
Attorney.

Patented Dec. 14, 1943

2,336,680

UNITED STATES PATENT OFFICE 2,336,680

SIGNAL APPARATUS

Stanley E. Gillespie, Evanston, Ill., assignor to Western Railroad Supply Company, Chicago, Ill., a corporation of Illinois Application August 19, 1940, Serial No. 353,242

13 Claims. (Cl. 177—329)

The present invention relates to signal lamp units particularly and adapted for highway intersection and railroad-highway grade crossing signals. More particularly the invention comprises a light unit including a primary source of light and a reflector, in combination with means which prevent and eliminate phantom signals resulting from the reflection by the reflector of the unit of incoming light from a secondary external source. In the present invention the phantom signals are eliminated by the use of light polarizing means which eliminate and prevent the reflection of light rays from an external source without appreciably impairing the effectiveness of the signal.

Referring now to the drawings in which preferred embodiments of the present invention are disclosed:

Figure 1 is an illustration of a flashing light grade crossing signal of a type in which the lamp unit constructed in accordance with the present invention finds particular usefulness;

Figure 2 is an enlarged front view of the lamp unit per se;

Figure 3 is an enlarged vertical section upon the line 3—3 of Figure 2 through the lamp unit per se and showing the parabolic reflector;

Figure 4 is a diagrammatic view illustrating the relationship of the light polarizing element relative to the reflector and to an incoming light ray from an external source;

Figure 5 is another diagrammatic view which illustrates the obstruction which is effected to prevent the passage of the incoming light ray from the secondary source through the unit;

Figure 6 is an enlarged view of the polarizing unit per se which is embodied in the first modification of the invention as illustrated in Figure 3;

Figure 7 is a section upon the line 7—7 of Figure 6;

Figure 8 is a transverse section through a different type of reflector or reflecting mirror known as the Mangin mirror and illustrates a different type of light polarizing means;

Figure 9 is a front view of the polarizing element per se of the modification illustrated in Figure 8;

Figure 10 is a transverse section through a third embodiment of the invention and illustrates the relationship of the light polarizing and controlling means relative to the reflector and to the cover glass, the entire unit being of the type illustrated in Figure 3 in connection with embodiment 1;

Figure 11 is a partial section through the showing of Figure 10 upon the line 11—11;

Figure 12 is a view in perspective of the light polarizing and light screen element which is embodied in this third form of the invention;

Figure 13 is a top elevation of the unit illustrated in Figure 12.

Signals used at highway intersections, signals used at highway-railroad grade crossings, and railroad signals today commonly embody electric light units. In a preferred form an electric light and reflector is positioned behind a colored cover glass and the person viewing the signal is informed that the signal is on or off by the passage of light which is thrown from the electric light source against the reflector and out through the cover glass. The cover glass may be of any desired color, as in the case of highway intersections, and is frequently red as in the case of danger signals at railroad-highway grade crossings. For the purposes of the present disclosure the application of the invention in a railroad-highway grade crossing signal has been disclosed and is illustrated in the drawings.

In such signals of the prior art observers will notice at times that difficulty is encountered in determining whether the signal is in fact on or off. This confusion is produced by external light rays from the sun or from the headlights of an automobile or an engine, or other similar source, which enter the signal through the cover glass and are reflected back by the reflector surface of the signal to give what is called a phantom or false signal. These phantom signals vary in intensity directly with the intensity of the outside or secondary source of light. The confusion which can result from such phantom signals is too obvious to require discussion and the danger which is present therefrom is likewise apparent.

In the signal unit constructed in accordance with the present invention means are incorporated into the signal which substantially eliminate all phantom or false signals which originate in outside light sources. Such signals are eliminated by light polarizing means incorporated in the light unit as will become hereinafter apparent from the reading of the complete description and a consideration in connection therewith of the attached drawings.

Referring now to the drawings and to Figures 1, 2 and 3 in particular, a preferred embodiment of the invention is illustrated incorporated into a railroad-highway grade crossing signal of the flashing type. The signal post 1, which is suitably mounted in the ground adjacent the highway-railroad intersection, carries at its top a bell 2 which is suitably operated. Therebelow are the usual cross arms bearing the words "Railroad crossing" and information to the effect that there are two tracks. Suitably mounted upon a laterally extending cross arm 3 are a pair of flashing signal light units 4, 4, which are electrically operated by suitable means not forming a part of this invention, to flash red warning signals during the approach of, and during the passage of, a train upon the tracks. Extending in the direction of the supporting post or pole 1 and positioned below the units 4 are a series of letters which may be of the reflecting type or which may be provided with internal illuminating means, being indicated generally by the reference character 5 and which spell out the word "Stop." This general arrangement of features is not of the essence of the invention and merely comprises the background in which the present invention finds particular usefulness.

Referring now to Figures 2 and 3 in particular the light unit per se or signal lamp unit per se is illustrated in detail. A lamp case 7 is provided internally with a parabolic glass reflector 8 which is held in place by means of suitable screw-held clamps 9, 9 and positioning pads 10 of suitable material such as felt, one of which is illustrated in Figure 3.

Pivotally mounted at the top of lamp case 7, and normally extending downwardly across the front open end thereof, is a door 11 which carries a packing or gasket 12 in contact with the front edge of the lamp case to seal therewith for the purpose of excluding moisture and foreign material. The door is normally clamped in closed sealing position by manually operable clamping means indicated generally by the reference character 13 and positioned at the underside of the case 7.

In the open front face of the door 11 is a transparent cover glass 15 which may be of any desired type and which is usually colored. The cover glass illustrated is provided with vertically extending rounded ribs on its inner concave side which cause light diffusion in a manner desirable for signals. Also carried by the door 11 is a background plate 16 which is illustrated as circular in shape and which serves to enlarge the apparent size of the lamp unit. There is also upon the front face of the unit a hood 17 the purpose of which is to eliminate and prevent the entrance of sunlight as much as possible.

The light source for the lamp unit comprises an electric bulb 20 at the reflector focus which is detachably and adjustably secured and seated within a socket element 21 positioned centrally of the reflector 8. A lock nut 22 adjustably secures the element in place and there is provided a screw held removable cap 23 on the back of the casing 7 which gives access to the back of the reflector and to the nut 22 to permit of adjustment of the bulb relative to the focus.

The bottom or underside of the lamp casing 7 is formed with a recess in which is positioned a terminal 25 to which the incoming current conducting leads extend and from which conductors 26 extend upwardly between the lamp casing and the reflector to the bulb-seating socket 21.

Positioned around the lamp bulb 20 and extended relatively closely adjacent thereto is a light polarizing transparent element 28. Element 28, which extends from the surface of reflector 8 forwardly to the cover glass 15, is preferably formed as a cylinder with a base rim carrying a pair of bulb-clamping springs 27 which enable it to be mounted upon the bulb 20. Figure 6 illustrates this light polarizing element and in that figure the direction of the lines, which extend at 45 degrees to a line parallel to the longitudinal axis of the cylinder, represent the direction of the polarizing axis of the element at any given point. An inspection discloses that upon opposite sides of the cylinder these axes will be mutually transverse and perpendicular, that is, they extend crosswise relative to each other when the direction of the axis at one point on the cylinder wall is considered relative to the direction at a point upon the diametrically opposite side thereof. This light polarizing element 28 may be formed of any suitable means adapted to plane polarize light, such a substance or material now being on the market under the name "Polaroid."

Referring now to Figures 4 and 5 in particular, the functional operation of the light polarizing means in eliminating phantom signals in the lamp unit constructed in accordance with the present invention is illustrated. An external source of light S is assumed which directs an incoming ray of light L against the reflector R. In the actual embodiment of the invention the light ray in entering the light unit would of course first pass through the unit cover glass. The light ray impinges upon the parabolic reflector R and is re-directed toward the opposite side thereof. The light polarizing element being positioned centrally of the parabolic mirror intercepts light rays which are reflected thereacross and the light beam upon entering one side of this element is substantially plane polarized, the wall of cylindrical element at the point of entrance of the light beam acting as a plane polarizing surface in the manner illustrated in Figure 5. The polarized light ray continues to cross the cylinder until it strikes the opposite face of the cylinder or element in which, however, the axis of polarization extends at right angles to that of the surface of the cylinder through which the light ray has passed. The light ray is unable to pass through this second wall or surface because of the inherent characteristics of polarized light and as a direct result does not reach the opposite side of the reflector to be reflected therefrom outwardly from the unit. Incoming light rays from an external secondary source are, it is seen, killed within the lamp unit itself.

It is relevant to note that light rays generated by the primary source of the lamp unit, that is, the bulb 20, do not encounter the difficulties which beset light rays from the external secondary source. This is because of the fact that such light rays in passing from the lamp unit pass through only one side of the encircling cylindrical light polarizing element and slight obstruction is presented thereto. The effectiveness and efficiency of the lamp unit and the signal is substantially unimpaired by the use of the present invention while the dangers from phantom signals is eliminated.

Referring now to Figures 8 and 9 in particular a second preferred embodiment of the invention is illustrated in which in place of the parabolic reflector 8 of the first embodiment there has been substituted a Mangin mirror reflector 32. These reflectors are also provided with a reflecting surface on their rear face and are formed by portions of the surfaces of two spheres, the inner sphere having a smaller diameter than the outer sphere and having its center advanced toward the surface of the outer sphere so that the two spheres are not in fact concentric. Such a reflecting mirror provides a construction having the characteristics of a parabolic reflector of much greater focal length and has proved to be extremely desirable in signals of the type discussed above. As in the first embodiment, an electric light source 33 is provided which comprises a light bulb suitably mounted within a socket 34. A cover glass 35 is again carried by the pivoted door 36 and the general construction is similar to that described in connection with embodiment 1. The cylindrical light polarizing element of the first embodiment, however, is replaced in the present construction by a conical disc 38 which is secured to the door 36 by means of a flange 39. Disc 38 comprises an upper half and a lower half in which the direction of the polarizing axes extend perpendicular to each other. The junction line between the two halves extends transversely through the center of the element and there is provided at the center a conical cap 40 of suitable opaque material which serves to fix the two parts relative to each other and which has an additional function of preventing the passage of all light rays at that point.

In this second embodiment of the invention, as in the first, it is conceived that incoming light rays from an external secondary source which enter the unit upon one side of the central longitudinal axis will emerge therefrom upon the opposite side of that axis. Accordingly, the provision of the light polarizing means which have polarizing axes extending in one direction in the upper half of the unit, and in a direction perpendicular to the first direction in the lower half thereof, will provide a construction in which the light rays which enter the unit upon one side will be polarized in such a manner that they will be obstructed upon being reflected into contact with the polarizing means at the opposite side thereof. The centrally located cap 40 performs the function of eliminating the return of all rays at the exact center of the unit, it having been found that at that point rays entering can emerge upon the same side of the center. The conical shape has also been found to be desirable in preventing reflections from the surface of the light polarizing element itself. Polarizing means of this type are usable with mirrors other than mirrors of the Mangin type.

Referring now to Figures 10 to 13, inclusive, the third preferred embodiment of the invention is illustrated. In this embodiment in addition to the light polarizing means per se which are found in the first two embodiments, there are combined therewith certain opaque light screens which prevent and eliminate the reflection of incident light rays from directions at a considerable angle from the major or principal axis of the light unit which, upon impinging upon the mirror are reflected thereacross in a manner which in some cases escapes contact with the light polarizing means. In Figure 10 the reflector or mirror is again indicated by the reference character 8 and the cover glass by the reference character 15. These elements may be and preferably are of the same type illustrated in Figure 3. The bulb socket 21 is again suitably mounted in the central axis of the reflector 8 and carries the light creating bulb 20. The light polarizing means comprises again the cylinder 28 of the first embodiment which seats upon the lamp bulb by means of the clamping rings 27 in a common and well known manner, these latter being carried by a suitable ring at the base of the element 28. Cooperating with the light polarizing element 28 in the control of the incoming light rays from an external source, are a plurality of opaque screens or barriers 42 which conform to the curvature of the reflecting mirror 8 and extend forwardly therefrom to the inner face of the cover glass 15. These barriers 42 intersect upon the major or principal axis of the light unit and extend radially relative thereto. As shown, these barriers or screens may be four in number and are spaced by an angle of ninety degrees.

From the inner side of the cover glass 15 each screen or barrier 42 extends inwardly to the reflector being cut-out centrally to extend around and downwardly adjacent the side of a cylindrical light polarizing element 28, as is possibly best illustrated in Figure 12. Spring clips 43 are secured to the outer edge of each barrier to enable it to be secured to the outer edge of the reflector mirror 8. The barriers 42 are preferably fixed relative to each other at their common intersection and may, if desired, be fixedly secured to the polarizing element 28, although this is not necessary.

In the operation of this last embodiment of the invention the light polarizing element 28 functions exactly as in the first embodiment and light rays which pass through that element are polarized upon passing through the first wall of the cylinder and are obstructed by the second wall thereof making impossible reflection from the unit. Should any rays, however, impinge upon the reflector 8, having first passed through the cover glass 15, and be reflected across the mirror without first passing through the cylindrical polarizing element 28, these rays would be intercepted by the opaque barriers 42. Being opaque, screens 42 do not permit the passage of light and, accordingly, such miscellaneous and irregular rays are obstructed thereby.

The light polarizing element 28 and the opaque barrier elements 42 in fact cooperate and supplement each other. As to light rays from an outside source which impinge directly from in front of the unit, the barrier elements 42 will have but little function for such rays will be reflected directly across the mirror 8 upon contact therewith and it will be the function of the light polarizing element to handle and prevent the return of such rays. As to light rays from a source so positioned that they make a considerable angle with the main axis of the unit, however, the opaque barriers 42 will play a more important part and such rays as do not pass through the light polarizing element 28 will impinge thereon and will be obstructed thereby.

I claim:

1. In a signal lamp unit, a primary light source, a reflector arranged to receive and reflect light rays from said source and to receive and return light rays from an outside source, the point of incidence of such rays being spaced from the point of final reflection, means to polarize incoming light rays from said outside source directed toward said reflector, and light polarizing means so positioned as to be traversed by reflected light from said reflector, characterized in that the polarizing axis of each of said means is disposed transversely to that of the other of said means.

2. In a signal lamp unit, a primary light source, a reflector arranged to receive and reflect light rays from said source and to receive and return light rays from an outside source, the point of incidence of such rays being spaced from the point of final reflection, and light polarizing means upon opposite sides of a principal axis through said reflector arranged to polarize all incident light rays to said reflector from said outside source and to obstruct said rays, said means being characterized by mutually transverse polarizing axes upon opposite sides of said axis.

3. In a signal lamp unit, a reflector having a focal point and arranged to receive at a point of incidence and finally reflect at a point spaced from said point of incidence, a light ray from an outside source, a primary light source at said focal point, a light polarizing means encircling said light source through which light rays from said source must pass in reaching said reflector, said light polarizing means being so constructed and arranged that incident light rays to said reflector from an outside light source must strike two light polarizing surfaces having mutually transverse polarizing axes whereby said rays from said outside source are polarized and obstructed.

4. In a signal lamp unit, a reflector having a focal point and adapted to receive and reflect at a point of incidence and finally reflect, respectively, upon diametrically opposite sides of the longitudinal axis, a light ray from an outside source, a primary light source at said point, light polarizing means encircling said light source through which light rays from said source must pass in reaching said reflector, said light polarizing means comprising a hollow cylinder formed of a light polarizing wall the polarizing axes of which extend at right angles to each other at diametrically opposite points, whereby incident light rays to said reflector from an outside source must pass across said cylinder to be polarized upon entering said cylinder and obstructed upon reaching a diametrically opposite point.

5. In a signal lamp unit, a reflector having parabolic characteristics, a primary light source positioned at the focus of said reflector, and light plane polarizing means upon opposite sides of a median line across said reflector having mutually transverse polarizing axes to plane polarize and to obstruct incident light rays from a secondary outside source.

6. In a signal unit, a reflector adapted to receive and reflect at a point of incidence and finally at spaced points, respectively, change the direction of light rays from an outside source, light plane polarizing means positioned relative to said reflector to intercept and plane polarize such rays, and second light plane polarizing means arranged with its axes transverse to said first means to obstruct said rays after passing through said first mentioned means.

7. In a signal lamp unit, a reflector having a focus and the characteristic of reflecting incoming light rays entering the signal upon one side of the longitudinal axis of the reflector, toward the diametrically opposite side of the axis, a primary light source positioned substantially at the focus of said reflector, a light polarizing element in front of said reflector through which incoming and outgoing light rays must pass, characterized in that the polarizing axis of said element upon one side of a medial dividing line passing at right angles through said longitudinal axis of the reflector extends transversely to the polarizing axis upon the opposite side of said line, whereby incoming light rays polarized by one side of said element are obstructed upon reaching the opposite side thereof.

8. In a signal lamp unit, a reflector having a focal point and the characteristic of receiving, reflecting, and finally reflecting incoming light rays from an outside source from the side of a medial dividing plane opposite to that on which they enter, a primary light source positioned at the focal point to direct light rays onto said reflector, and a conical disc of light polarizing material positioned in front of said reflector, the polarizing axis of said disc extending in one direction upon one side of said medial dividing plane and at right angles to the first direction upon the opposite side of said plane, whereby incoming light rays from said outside source are polarized upon passing through one side of said disc and are obstructed upon being reflected to the opposite side thereof.

9. The structure recited in claim 8 characterized in that said disc is provided centrally with an opaque portion to obstruct incidental rays which are reflected to the side of said disc at which they entered.

10. In a signal lamp unit, a lamp casing, a reflector having a focal point in said casing of the type adapted to receive and reflect an impinging light ray at one point and to reflect it finally from a second point, a door carried by said casing, a cover glass in said door opposite said reflector, a lamp bulb in substantially the focal point of said reflector, and light plane polarizing means positioned within said casing between said cover glass and said reflector and including physically spaced portions having mutually transverse polarizing axes, said means being so arranged and positioned that said portions successively are traversed by an incident light ray to said reflector from an outside source.

11. In a signal lamp unit, a primary light source, a reflector arranged to receive and reflect light rays from said source and to receive and return light rays from an outside source, the point of incidence of such rays being spaced from the point of final reflection, light polarizing means arranged upon opposite sides of the principal axis of said reflector having a principal axis and to polarize incident light rays from said outside source positioned forwardly of said unit and which impinge on said reflector and to obstruct such rays, and opaque barriers in planes parallel to said principal axis arranged as to be traversed by light rays from said outside source which impinge upon said reflector at a relatively great angle to the principal axis of said reflector and which rays do not contact said light polarizing means.

12. In a signal lamp unit, a primary light source, a reflector arranged to receive and reflect light rays from said source and to receive and return light rays from an outside source, the point of incidence of such rays being spaced from the point of final reflection, light polarizing means arranged to polarize incident light rays from said outside source impinging on said reflector, and opaque screens extended outwardly from said reflector constructed and arranged as to be traversed by incident light rays which do not contact said light polarizing means.

13. In a signal lamp unit, a reflector having a focal point and adapted to receive and reflect at a point of incidence and finally reflect, respectively, upon diametrically opposite sides of the longitudinal axis, a light ray from an outside source, a primary light source at said point, a light polarizing means encircling said light source through which light rays from said source must pass in reaching said reflector, said light polarizing means comprising a hollow cylinder the light polarizing axis of the wall of which makes an angle of 45 degrees with an intercepting line extended parallel to the major axis of the cylinder, whereby incident light rays to said reflector from an outside source must pass across said cylinder to be polarized upon passing through the cylinder wall and obstructed at an opposite point, and opaque screens in planes parallel to said longitudinal axis radiating outwardly from the said major axis and around said cylinder to intercept light rays reflected across said reflector outside said cylinder.

STANLEY E. GILLESPIE.